United States Patent [19]
Thomas et al.

[11] Patent Number: 5,838,736
[45] Date of Patent: Nov. 17, 1998

[54] METHOD AND APPARATUS FOR GENERATING CARRIERS FOR PHASE DEMODULATION HAVING AT LEAST TWO PHASE STATES, AND A CORRESPONDING DEMODULATION STAGE

[75] Inventors: Gérard Thomas, Eragny Sur Oise; Luc Brignol, Paris; Florence Christien, Sannois, all of France

[73] Assignee: Alcatel N.V., Rijswijk, Netherlands

[21] Appl. No.: 585,462

[22] Filed: Jan. 16, 1996

[30]      Foreign Application Priority Data

Jan. 17, 1995 [FR] France .................................. 95 00452

[51] Int. Cl.[6] .............................. H03D 3/22; H04L 27/22
[52] U.S. Cl. .............................................. 375/329; 375/326
[58] Field of Search ..................................... 375/329, 326, 375/324, 332, 261; 329/304, 345; 455/205, 230, 337, 214

[56]             References Cited

U.S. PATENT DOCUMENTS 4,320,345   3/1982   Waggener .
4,647,863   3/1987   Skudera, Jr. et al. .

OTHER PUBLICATIONS

Avramov, I.D. et al, "A Surface Transverse Wave–Based MSK System", *IEEE Transactions on Ultrasonics, Ferroelectrics And Frequency Control*, vol. 38. No. 3, 1 May 1991, pp. 194–198, XP 000206316.

*Primary Examiner*—Stephen Chin
*Assistant Examiner*—Betsy L. Deppe
*Attorney, Agent, or Firm*—Sughrue, Mion, Zinn, Macpeak & Seas, PLLC

[57]             ABSTRACT

The apparatus and method pertain to generation of two receive carriers which are related to each other in quadrature. The apparatus and method employ a phase-shifter which generates one or more phase-shifted signals from a received signal. A signal selector selects a signal as a function of either a predetermined phase state associated with an initialization symbol during reception of the symbol or an estimated phase state estimated by a demodulation state on the basis of the received signal during reception of the message symbols such that the selected signal constitutes a receive carrier, which is also referred to as a reference carrier. In addition, the selected signal is stored and played back after a symbol duration before delivering the reference carrier. Finally, a second phase-shifter is used to generate a second receive carrier from the reference carrier.

17 Claims, 3 Drawing Sheets

METHOD AND APPARATUS FOR GENERATING CARRIERS FOR PHASE DEMODULATION HAVING AT LEAST TWO PHASE STATES, AND A CORRESPONDING DEMODULATION STAGE

BACKGROUND OF THE INVENTION

The invention relates to demodulation corresponding to phase modulation or phase shift keying (PSK) having at least two phase states, as well as to demodulation corresponding to quadrature amplitude modulation (QAM).

The invention relates more precisely to a method and apparatus for generating two receive carriers that are necessary for performing such demodulation. Such receive carriers, which have the same frequency and which are in quadrature relative to each other, are generally referred to as a direct receive carrier and as a quadrature receive carrier.

On transmission, a modulated signal is constituted by a series of symbols chosen from among the M possible symbols corresponding to the M possible modulation states (phase states for PSK and phase-amplitude states for QAM). Each of the M possible signals $S_k$, $k \in [1, M]$, is obtained by summing, for a predetermined duration referred to as the symbol duration Ts (or baud time), two amplitude-modulated (product modulation) transmit carriers PE0, PE1 (having the same frequency and being in quadrature relative to each other). This can be expressed by the relationship $S_k = a_k \cdot PE0 + b_k \cdot PE1$. Each possible symbol may therefore be associated with a pair of amplitude levels $(a_k, b_k)$ representing the coordinates of a point in a reference frame in which each of the base vectors is one of the two transmit carriers PE0, PE1.

On reception, the received signal is demodulated. For that purpose, it is multiplied by a direct receive carrier PR0 and by a quadrature receive carrier PR1. The products obtained at the outputs of the multipliers are filtered (low-pass filtering), and then compared with predetermined thresholds. The results of the comparisons are supplied both to a decision module which deduces therefrom an estimated modulation state corresponding to the received signal, and also to a rate recovery module which generates a clock (or rate) signal of period equal to the symbol duration Ts. Finally, the output of the decision module is sampled at the instants n.Ts, so as to generate a series of received symbols.

It appears from the above that, in order to perform demodulation correctly, the following must be done:

- it is necessary to recover two receive carriers PR0, PR1 which must be in synchronization and in phase with the transmit carriers PE0, PE1; and
- it is necessary to recover the demodulation rate, i.e. to know the instants n.Ts of transition between successive symbols in the received signal.

In known demodulation systems, a local oscillator generates the direct receive carrier, and a π/2 phase-shifter makes it possible to generate, by delay, the quadrature receive carrier PR1.

Such known systems suffer from the major drawback of requiring two synchronization loops: namely, one loop for the direct receive carrier (so as to act on the frequency and the phase of the local oscillator), and another loop for the demodulation rate (so as to act on the sampling instants at which the output of the decision module is sampled).

Implementing the two synchronization loops is often complex and difficult, and generally requires digital signal processor (DSP) circuits which, in spite of their high processing speed, cannot process signals having high frequencies (such as carrier frequencies of several hundred MHz). Furthermore, such implementation requires the presence of an initialization sequence that is relatively long (and known to the receiver) at the beginning of the series of transmitted symbols so as to provide convergence for the two loops, which are generally interleaved. The demodulation rate is taken from a demodulation eye diagram obtained by means of the direct receive carrier. To provide convergence for the carrier synchronization loop, carrier advance or retard information must be validated by knowing the demodulation rate.

Known demodulation systems therefore require synchronization times that are long compared with transmission speed. In other words, known systems require initialization (or training) sequences that comprise a relatively large number of symbols.

Such known demodulation systems therefore cannot be used in packet or burst mode, or in alternating mode. In such a mode each of the packets successively transmitted must be synchronized (the receive carriers and the demodulation rate must be recovered). Since the number of symbols that can be contained in a packet is limited, if the initialization sequence corresponds to a large number of symbols, the packet can only convey a number of message symbols that is too small.

SUMMARY OF THE INVENTION

A particular object of the invention is to mitigate the various drawbacks of the state of the art.

More precisely one of the objects of the present invention is to an provide apparatus for generating two receive carriers, which apparatus does not require a local oscillator or a synchronization loop.

Another object of the invention is to provide such apparatus which makes it possible for the received signal to be synchronized at very high speeds, and which can therefore be applied to very high data-rate transmission (several tens of Mbit/s) using carriers having high frequencies (several hundreds of MHz).

A further object of the invention is to provide such apparatus which makes demodulation possible in a transmission system operated in packet mode.

The invention achieves the various objects mentioned above, and others that appear below by providing apparatus for generating two receive carriers having the same frequency, referred to as the carrier frequency $f_p = 1/T_p$, and being in quadrature relative to each other, said apparatus being designed to be integrated in a demodulation stage for demodulating a received signal modulated using phase modulation having at least two phase states, said received signal conveying at least one series of symbols, which series is constituted by an initialization sequence comprising at least one initialization symbol, and by a message sequence comprising at least one message symbol, each symbol corresponding to one of said phase states;

said initialization sequence being known to said apparatus, and said apparatus comprising:

first phase-shifting means for generating a plurality of phase-shifted signals from said received signal, each phase-shifted signal having a distinct phase shift relative to said received signal;

signal selection means for selecting a signal, referred to as a selected signal from among said plurality, as a function:

either of a predetermined phase state associated with said initialization symbol during reception of said initialization sequence;

or of an estimated phase state estimated by said demodulation stage on the basis of the received signal during reception of said message sequence;

so that said selected signal constitutes one of said receive carriers, referred to as a reference carrier;

storing and play-back means for storing the selected signal and playing it back after a delay that is substantially equal to a symbol duration, so as to deliver said reference carrier; and second phase-shifting means for generating the other one of said receive carriers from said reference carrier.

The expression "phase modulation having at least two phase states" is to be understood in a very broad sense, i.e. as encompassing the various types of PSK proper, and the various types of QAM. It is considered herein that the various types of QAM, for which the term "phase-amplitude state" is used instead of "phase state", are particular cases of phase modulation combined with amplitude modulation.

The principle of the invention thus consists in extracting, during each symbol duration, two receive carriers from the received signal, which carriers are present implicitly in the received signal, and in using the extracted receive carriers for demodulating the received signal during the following symbol duration.

In other words, each signal portion received during a symbol duration is:

firstly demodulated by means of two receive carriers extracted from the signal portion received during the preceding symbol duration, so as to supply an estimated symbol; and secondly processed (as a function of the estimated symbol duration), then stored, so as to supply two receive carriers making it possible to demodulate the signal portion received during the following symbol duration.

Such processing of a received signal portion as a function of a corresponding estimated symbol consists in phase-shifting the received signal portion so as to obtain one of the receive carriers, referred to as a reference carrier (the other receive carrier being deduced from the reference carrier).

Each of the possible symbols is associated with one of the possible phase states, which corresponds to a known phase difference relative to the receive carriers. Therefore, if it is possible to determine which symbol corresponds to a received signal portion, it is possible to determine what phase-shift to apply to the received signal portion in order to obtain one of the receive carriers.

On initializing the transmission, and so that the apparatus knows what processing to apply to the signal portion received during the first symbol duration, the first transmitted symbol (or initialization symbol) is known to the apparatus.

The signal portion received during the first symbol duration is not to be demodulated (since the apparatus has no available receive carriers extracted from a previously received signal portion), but merely to be stored, after processing, so as to supply the two receive carriers required for demodulating the signal portion received during the following symbol duration.

As from the second symbol duration, the apparatus no longer needs any predetermined information. For each received signal portion, it has two receive carriers making it possible to perform demodulation supplying an estimated symbol, the estimated symbol making it possible to choose the processing to be applied to the received signal portion so as to obtain the two receive carriers to be used during the following symbol duration.

Thus, according to the invention, the initialization sequence can comprise a single symbol. As a result, the synchronization speed can be very high.

In particular, the invention is very well suited to packet mode (or alternating mode) transmission in which the received signal includes a plurality of successive series (referred to as packets) of symbols, it being necessary for each packet to be synchronized. By means of the invention, each packet can comprise a single initialization symbol only, it being possible for all of the other symbols to be used for conveying message data.

Furthermore, the apparatus of the invention does not require a local oscillator or a synchronization loop for correcting the frequency and the phase of the local oscillator.

The apparatus of the invention is therefore much less complex and easier to implement than known apparatus that generally includes a local oscillator and a voltage-controlled oscillator VCX0.

The invention is particularly applicable to high data rate (several tens of Mbit/s) transmission in which the receive carriers have high frequencies (several hundred MHz).

Clearly, the principle of the invention may be implemented either with analog-type components or with digital-type components.

Advantageously, said distinct phase shift presented by each phase-shifted signal relative to the received signal is equal to the phase shift between one of said possible phase states and said reference carrier.

In a particular embodiment of the invention, said first phase-shifting means comprise a first analog delay line of the surface acoustic wave type, having an input and a plurality of pairs of output electrodes delivering said plurality of phase-shifted signals, each pair of output electrodes delivering one of said phase-shifted signals presenting a phase shift that is a function of the distance between said input and said electrodes.

In this way, the various phase shifts applied to the received signal during demodulation are easy to implement.

Each pair of output electrodes corresponds to a delay (or phase-shift) step-size equal to a fraction of the period of the reference carrier (the period of the reference carrier corresponding to a phase shift of $2\pi$).

In an advantageous embodiment of the invention, said phase modulation being combined with amplitude modulation, so as to constitute quadrature amplitude modulation having a plurality of possible phase-amplitude states, said apparatus includes means for weighting each of the phase-shifted signals generated by the first phase-shifting means, so that said selected signal has amplitude that remains substantially constant over time, regardless of the successively selected phase-shifted signals.

Preferably, said weighting is obtained by modifying the lengths of the pairs of output electrodes.

In a preferred embodiment of the invention, said storing and play-back means comprise a second analog delay line of the surface acoustic wave type, having an input and a pair of output electrodes for playing back the selected signal after said predetermined delay that is substantially equal to a symbol duration.

In an advantageous variant, said storing and playback means also constitute filtering means for filtering said selected signal, while enabling N successive portions of said selected signal to be stored, said filtering consisting in playing back a filtered signal obtained by summing said N successive portions.

In this way, the storing and play-back means start playing back a filtered signal as soon as they have received a portion of the selected signal (i.e. after a fraction 1/N of the symbol duration). Then, the quality of the filtering is improved each time a new portion of the selected signal is taken into account, until optimum filtering is reached when N portions are taken into account.

It should be noted that the quality of the filtering may be further improved by increasing the number of symbols in the initialization sequence.

Advantageously, each of the N portions of the selected signal has a duration that is substantially equal to the period $T_p$ of the receive carriers.

Thus, each portion contains one cycle of the selected signal.

The resulting filter is a transversal filter having a set-up time (or transfer time) equal to the symbol duration, and a center frequency equal to the frequency of the reference carrier, thereby making it possible to extract the reference carrier from noise.

Such filtering also makes it possible to multiply by N the gain on the played-back signal as against playing back without filtering, after a symbol duration. Each portion of the played-back signal is obtained by summing N portions of the selected signal.

Advantageously, each of the N portions of the selected signal is assigned a weighting coefficient.

In this way, it is possible to perform a more complex filtering function. However, it is then necessary to make sure that the phase of the filtered signal is always equal to the phase of the selected signal.

Advantageously, in the above-mentioned variant, said storing and play-back means comprise a second analog delay line of the surface acoustic wave type, having an input and a plurality of pairs of output electrodes delivering said N portions of the selected signal.

Once again, using an analog delay line of the surface acoustic wave type offers the advantage of being simple to implement.

Advantageously, said reference carrier is a direct receive carrier, and [ . . . ] said second phase-shifting means shift the phase of said reference carrier by about $T_p/4$, so as to generate, by delay, the other of said receive carriers, referred to as a quadrature receive carrier.

In an advantageous variant, said reference carrier is a quadrature receive carrier, and [ . . . ] said second phase-shifting means shift the phase of said reference carrier by about $3T_p/4$, so as to generate, by delay, the other one of said receive carriers, referred to as a direct receive carrier.

In this advantageous variant, i.e. when the reference carrier is the quadrature carrier, several advantageous embodiments of the second phase-shifter means (making it possible to obtain the direct carrier) can be considered:

either said second phase-shifting means comprise a third analog delay line of the surface acoustic wave type having a delay substantially equal to $T_p/4$, and sign-inverting means;

or, when the storing and play-back means comprise a second delay line that does not perform an additional filtering function, said second delay line also constitutes said second phase-shifting means, by having an additional output electrode pair that is inverted and offset by $T_p/4$ relative to said pair of output electrodes;

or else, when the storing and play-back means comprise a second delay line that performs an additional filtering function, said second delay line also constitutes said second phase-shifting means, by having a plurality of additional output electrode pairs that are inverted and offset by $T_p/4$ relative to said plurality of pairs of output electrodes.

Clearly, without going beyond the ambit of the invention, a person skilled in the art can deduce from the various embodiments solutions suitable for when the reference carrier is the direct carrier, and when the reference carrier must be phase-shifted by $T_p/4$ to obtain the quadrature carrier.

The invention also provides a demodulation stage for demodulating a received signal modulated by using phase modulation having at least two phase states, said received signal conveying at least one series of symbols, which series is constituted by an initialization sequence comprising at least one initialization symbol, and by a message sequence comprising at least one message symbol, said demodulation stage including apparatus for generating two receive carriers as described above.

Finally, the invention also provides a method of generating two receive carriers having the same frequency, referred to as the carrier frequency $f_p=1/T_p$, and being in quadrature relative to each other, said method being designed to be implemented in a demodulation stage for demodulating a received signal modulated using phase modulation having at least two phase states, said received signal conveying at least one series of symbols, which series is constituted by an initialization sequence comprising at least one initialization symbol, and by a message sequence comprising at least one message symbol, each symbol corresponding to one of said phase states;

said initialization sequence being known to said demodulation stage, and said method comprising the following steps:

phase-shifting said received signal so as to generate a plurality of phase-shifted signals, each phase-shifted signal having a distinct phase shift relative to said received signal;

selecting a signal, referred to as a selected signal, from among said plurality, as a function:

of a predetermined phase state associated with said initialization symbol during reception of said initialization sequence; or of an estimated phase state estimated by said demodulation stage on the basis of the received signal during reception of said message sequence;

so that said selected signal constitutes one of said receive carriers, referred to as a reference carrier;

storing the selected signal and playing it back after a delay that is substantially equal to a symbol duration, so as to deliver said reference carrier; and phase-shifting said reference carrier so as to generate the other one of said receive carriers.

BRIEF DESCRIPTION OF THE DRAWINGS

Other characteristics and advantages of the invention appear on reading the following description of a preferred embodiment of the invention, given by way of non-limiting example and with reference to the accompanying drawings, in which.

DETAILED DESCRIPTION OF THE INVENTION

The invention relates to a method and apparatus for generating two receive carriers used for performing phase demodulation having at least two phase states.

Figure 1:
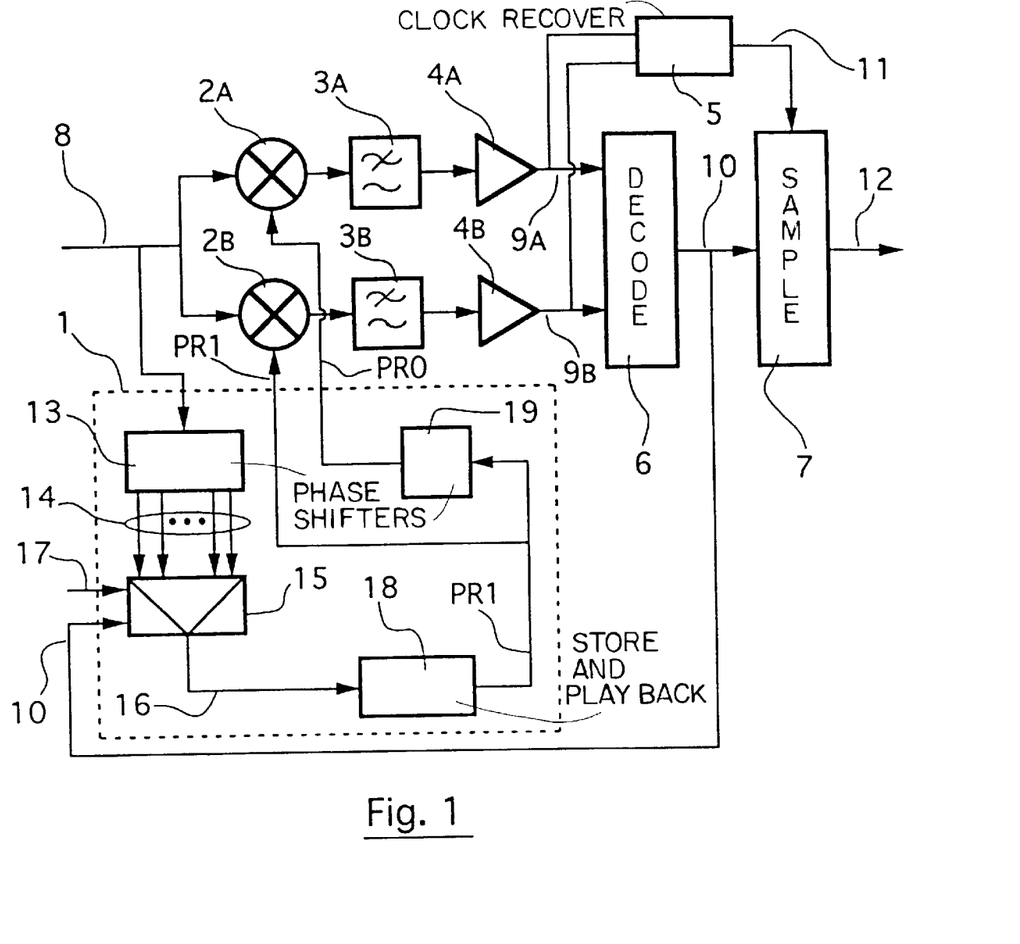
FIG. 1 is a block diagram of an example of a demodulation stage including apparatus of the invention for generating receive carriers.

FIG. 1 is a block diagram showing an example of a demodulation stage including apparatus 1 of the invention for generating two receive carriers PR0, PR1.

The invention lies in the way the receive carriers PR0, PR1 are generated, and not in the way they are used, which is quite conventional.

The receive carriers PR0, PR1 must have the same frequency (referred to as the carrier frequency) $f_p=1/T_p$, and they must be in quadrature relative to each other. In the remainder of the description, it is assumed that PR0 is the direct carrier, and that PR1 is the quadrature carrier.

With reference to FIG. 1, the structure and operation of an example of a phase demodulation stage is described below.

The demodulation stage includes in particular multiplication means $2_A$, $2_B$, low-pass filtering means $3_A$, $3_B$, comparator means $4_A$, $4_B$, demodulation rate recovery means 5, decision means 6, and sampling means 7.

The demodulation stage receives a modulated signal 8 that is modulated using phase modulation having at least two phase states.

The received signal 8 is multiplied ($2_A$, $2_B$) both by the direct carrier PR0 and by the quadrature carrier PR1. Each of the products obtained at the outputs of the multipliers $2_A$, $2_B$ is filtered ($3_A$, $3_B$) and then compared ($4_A$, $4_B$) with a predetermined threshold. The results $9_A$, $9_B$ of the comparisons are supplied:

to the decision means 6 which deduce therefrom an estimated phase state 10 corresponding to the received signal 8; and to the demodulation rate recovery means 5 which generate a clock (or demodulation rate) signal 11 of period equal to the symbol duration $T_S$ (or baud time).

The estimated phase state 10 at the output of the decision means 6 is sampled (7) at the demodulation rate 11, so as to generate a series of received symbols 12.

Generally, direct receive carriers and quadrature receive carriers are generated by a local oscillator controlled by a carrier frequency recovery loop, convergence of the loop being possible only by taking into account carrier advance or retard information supplied by the rate recovery means 5.

The apparatus 1 of the invention makes it possible to generate receive carriers PR0, PR1 without using a local oscillator or a carrier frequency recovery loop. To make this possible, the received signal conveys at least one series of symbols constituted by:

an initialization sequence comprising at least one initialization symbol; and a message sequence comprising at least one message symbol.

The invention is particularly advantageous for packet mode transmission. In such a transmission mode, each series of symbols is quite short (such series are referred to as packets of symbols) and must be synchronized. By making it possible to perform synchronization by means of a single initialization symbol, the invention makes it possible to optimize the ratio between the number of message symbols per packet, and the total number of symbols per packet.

The present invention is comprised of a first phase-shifting means 13 for generating a plurality of phase-shifted signals 14 from the received signal 8, with each phase-shifted signal having a distinct phase shift relative to said received signal.

A signal selection means 15 selects a signal, referred to as a selected signal 16 from among the plurality 14 of phase-shifted signals, as a function:

of a predetermined phase state 17 associated with the initialization symbol during reception of the initialization sequence; or of an estimated phase state 10 estimated by the decision means 6 during reception of the message sequence.

The selected signal 16 constitutes one of the receive carriers PR0, PR1, referred to as a reference carrier (namely PR1 in the example shown in FIG. 1). Clearly, however, the invention is also applicable when the reference carrier is PR0 and when PR1 is deduced from PR0.

Storing and play-back means 18 stores the selected signal 16 and plays it back after a delay that is substantially equal to a symbol duration $T_S$, so as to deliver the reference carrier PR1.

Finally second phase-shifting means 19 generates the other receive carrier PR0 from the reference carrier PR1.

Figure 2:
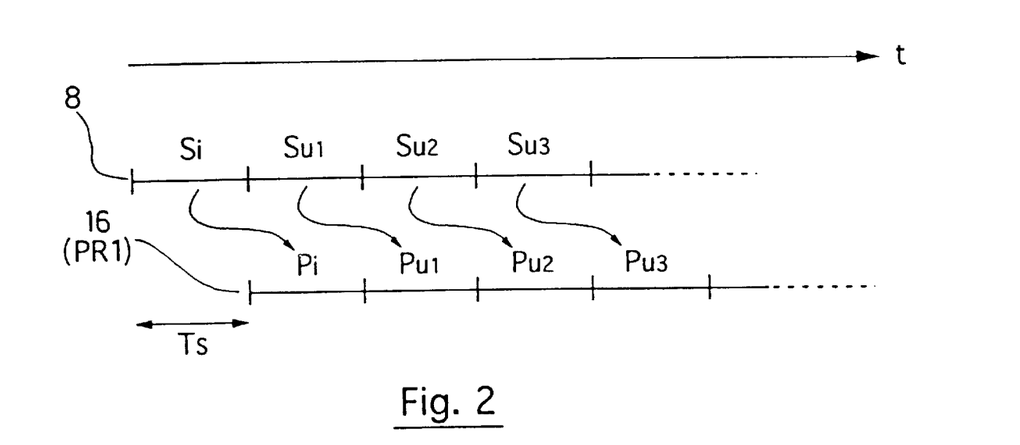
FIG. 2 shows an example of a received signal conveying a series of symbols, and the corresponding signal as played back by the storing and play-back means shown in FIG. 1.

FIG. 2 shows an example of a received signal 8, and the corresponding selected signal 16. The received signal 8 conveys a series of symbols constituted by an initialization symbol $S_i$ and by a plurality of message symbols $Su_1$ to $Su_3$. The selected signal PR1 conveys a series of signal portions $P_i$, $Pu_1$ to $Pu_3$. Each portion of the selected signal PR1 is a portion of the received signal 8 that has been phase-shifted and stored during a symbol duration Ts.

The remainder of the description concerns demodulation corresponding to QAM having 16 phase-amplitude states. Clearly, the invention is not limited to this demodulation example, but rather it concerns more generally all types of phase demodulation having at least two phase states (namely all types of PSK and QAM demodulation).

Figure 3:
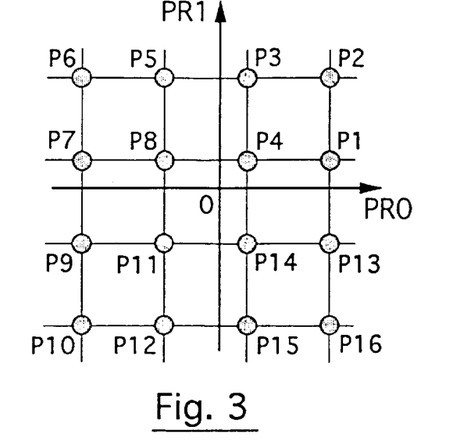
FIG. 3 shows a constellation of phase-amplitude states of 16 QAM by means of which the signal received by the demodulation stage of FIG. 1 may be modulated.

FIG. 3 shows a constellation of points P1 to P16 corresponding to the phase-amplitude states of 16 QAM modulation.

Each point P1 to P16, which corresponds to a distinct possible symbol, is defined by its co-ordinates in the reference frame (0, PR0, PR1), where PR0 and PR1, the direct receive carrier (zero phase) and the quadrature receive carrier (90° phase), are base vectors of the reference frame.

So that the selected signal 16 has a phase identical to the receive carrier chosen (arbitrarily) as the reference carrier, the selection means 15 receive information indicating to them the phase state of the signal portion 8 (of duration Ts) being received.

The initialization symbol $S_i$, namely the first symbol in the series, is a predetermined symbol 17 known to the apparatus 1, and supplied to the selection means 15. In this way, the selection means 15 know by what quantity the received signal 8 must be phase-shifted in order to constitute the selected signal 16.

The following symbols $Su_1$ to $Su_3$ in the series are not known to the apparatus 1 because they convey message data. But the received signal portion 8 corresponding to each of the symbols $Su_1$ to $Su_3$ can be demodulated on being received by the apparatus 1 because the apparatus then has two reference carriers PR0, PR1. Such demodulation of a signal portion amounts to estimating the phase state 10 of the signal portion, i.e. to which point of the constellation the signal portion corresponds. Finally, once the phase state has been estimated, the selection means 15 know by how much the received signal portion 8 must be phase-shifted in order to constitute a selected signal portion 16 (i.e. in order to be in phase with the reference carrier).

By way of example, it can be assumed that the initialization symbol $S_i$ corresponds to the point P2 (cf FIG. 4), and that the reference receive carrier is PR1.

Figure 4:
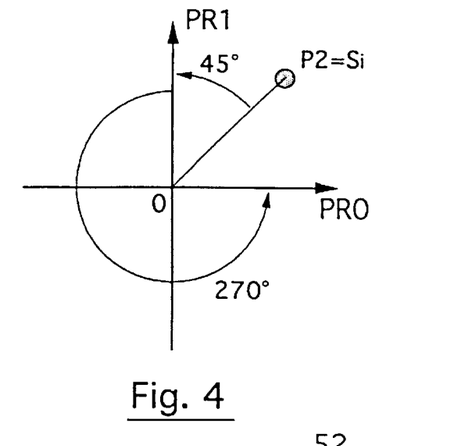
FIG. 4 shows an example of a phase-amplitude state corresponding to a choice of initialization symbol.

In which case, during reception of the initialization symbol (first symbol duration), the selected signal 16 is that signal, from among the plurality 14 of possible phase-shifted signals, which corresponds to the received signal 8 phase-shifted by 45°.

During reception of each message symbol $Su_1$ to $Su_3$ (second, third, etc. symbol duration), the received symbol 8 is demodulated (by means of the receive carriers PR0, PR1 deduced from the signal selected during the preceding symbol duration) and a corresponding phase state 10 is estimated.

Knowledge of this estimated phase state 10, whose value may vary over time, makes it possible to know what phase shift the selected signal 16 must present relative to the received signal in order to be actually in phase with the reference receive carrier (PR1 in this example). For example, if the first message symbol $Su_1$ is associated with the point P6, the correct selected signal 16 is that which corresponds to the received signal 8 phase-shifted by 315°.

During the same symbol duration, the selected signal 16 can correspond to a plurality of "incorrect" phase-shifted shifted signals before it corresponds to the "correct" phase-shifted signal. Choosing incorrect phase-shifted signals corresponds to the preceding estimated phase state going non-instantaneously to the new estimated phase state.

For example, if the second message symbol $Su_2$ is associated with the point P16, the correct selected signal 16 is that which corresponds to the received signal 8 phase-shifted by 135°. In which case, if the decision means 6 estimate the point P10 prior to estimating the point P16, the selection means select an incorrect phase-shifted signal which corresponds to the received signal 8 phase-shifted by 225°.

Such convergence of the selected signal 16 towards its correct value poses no problems if it is fast enough relative to the symbol duration Ts.

It should be noted that since the estimated phase state 10 can vary over time (in particular at the beginning of the symbol duration), it is its value at the sampling instant (which instant is determined by the demodulation rate 11 and is the final instant of the symbol duration) that is chosen to constitute the phase state associated with the received signal portion during the symbol duration.

In a particular embodiment (cf FIG. 5), the first phase-shifting means 13 comprise a first analog delay line of the surface acoustic wave type 52. The first delay line 52 has an input 51 and a plurality of pairs of output electrodes {(a0, a1), (a1', a0'), ..., (f0, f1), (f1', f0')}. Each pair of output electrodes delivers one of the phase-shifted signals 14 having a phase shift that is a function of the distance between the input 51 and the electrodes in the pair.

Figure 5:
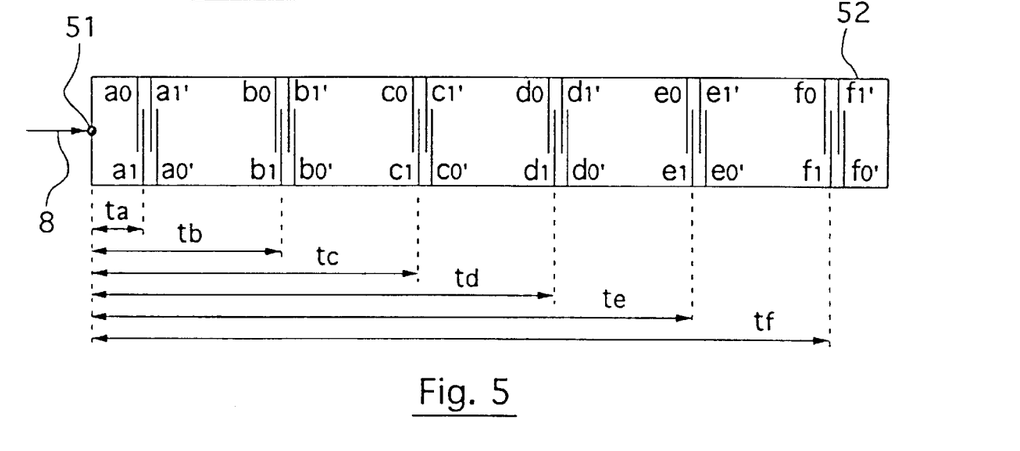
FIG. 5 is a particular embodiment of the first phase-shifter means shown in FIG. 1.

When the demodulation is 16 QAM demodulation, there are 12 different phase shifts between the 16 points and the reference carrier (e.g. PR1). There are four pairs of points having the same phase (P6, P8), (P10, P11), (P14, P16), (P2, P6).

In order to reduce the physical length of the first delay line 52, it is possible to act on the symmetry of the constellation about the center of the reference frame. Thus, the points P5, P6, P7, P9, P10, and P12 are obtained by symmetry respectively from the points P15, P16, P13, P1, P2, and P3. This 180° phase shift corresponds to sign inversion which is performed on the delay line 52 by duplicating the electrodes. In this way, for example, the voltage across the terminals of the electrodes (a0, a1) is the inverse of that across the terminals of the electrodes (a1', a0'), and the two pairs of electrodes are placed close enough together for the delay between the signals available at the two outputs to be negligible.

In the preceding example, it is merely necessary to have 6 delay step-sizes (each of which is associated with two outputs that are inverted relative to each other) having phase shifts equal to:

$t_a = 18.44° = 0.052 \times T_p$, for point P3;

$t_b = 45° = 0.125 \times T_p$, for point P2;

$t_c = 71.56° = 0.198 \times T_p$, for point P1;

$t_d = 108.44° = 0.3012 \times T_p$, for point P13;

$t_e = 135° = 0.375 \times T_p$, for point P16;

$t_f = 161.56° = 0.448 \times T_p$, for point P15;

So that the selected signal 16 has substantially constant amplitude, the apparatus 1 may also include weighting means for weighting each of the phase-shifted signals 14 generated by the phase-shifting means 13.

In the reference frame (0, PR0, PR1), each point $P_i$, i E [1,16], of the constellation may be associated with a vector (0, $P_i$) of modulus $P_i$. For example, if the amplitude levels (−3, −1, +1, +3) are considered, then:

$$P3 = P1 = \sqrt{10}/3 \quad P2 = \sqrt{2} \quad P3 = \sqrt{2}/3$$

Weighting may then consist in multiplying each phase-shifted signal associated with a point Pi by the inverse of the corresponding modulus A/$P_i$.

In the example shown in FIG. 5, such weighting may be obtained by modifying the lengths of the pairs of output electrodes.

It should be noted that if the amplitude of the selected signal 16 is not substantially constant, it is preferable to place voltage limiters (for the receive carriers PR0, PR1) upstream from the multiplication means $2_A$, $2_B$.

Figures 6, 7:
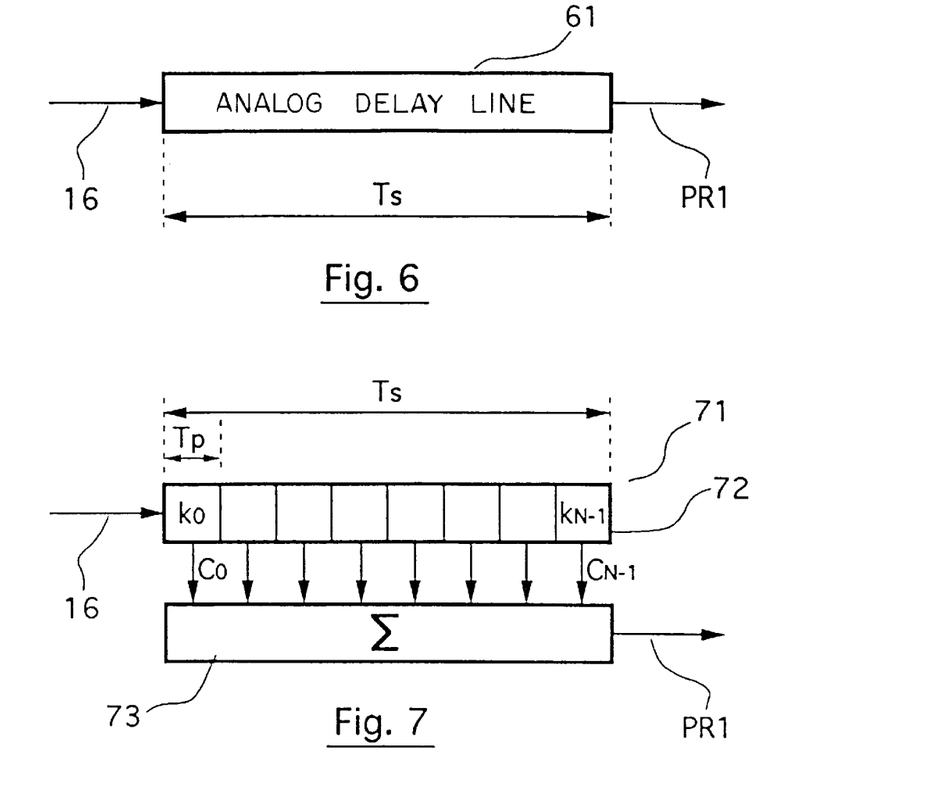
FIGS. 6 to 8 show distinct embodiments of the storing and play-back means shown in FIG. 1.
Figure 8:
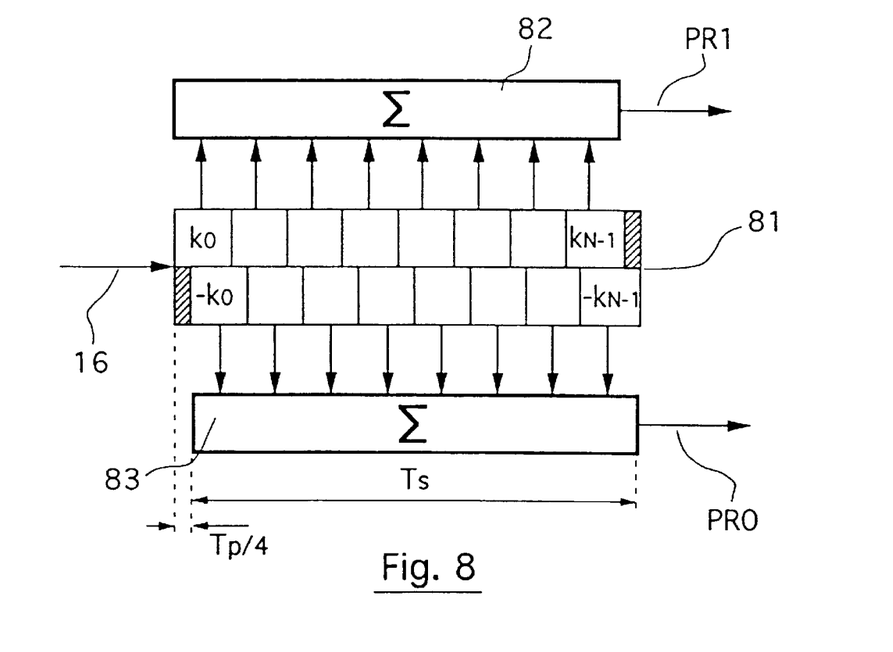

Each of FIGS. 6 to 8 shows a distinct embodiment of the storing and play-back means 18 shown in FIG. 1.

In a first embodiment (cf FIG. 6), the storing and play-back means are constituted by a second analog delay line 61 of the surface acoustic wave type, imparting a delay substantially equal to a symbol duration Ts.

In the second and third embodiments (cf FIGS. 7 and 8), the storing means 18 also constitute filtering means for filtering the selected signal 16.

Thus, in the second embodiment (cf FIG. 7), the storing and play-back means 71 make it possible to store N successive portions $k_0$ to $k_{N-1}$ (of duration $T_s/N$) of the selected signal 16, and the filtering consists in taking as the played-back signal (and therefore as the reference carrier PR1) the sum (73) of the N successive portions.

Preferably, signal portions $k_0$ to $k_{N-1}$ are taken that are of duration substantially equal to the period $T_p$ of the receive carriers ($T_s/N = T_p$). Thus, a transversal filter is obtained having a narrow band around the carrier frequency $f_p$.

Each of the N portions $k_0$ to $k_{N-1}$ may be assigned a weighting coefficient $c_0$ to $c_{N-1}$, so as to perform more complex filtering functions. It is then necessary to make sure that the phase of the selected signal is conserved.

For example, the second embodiment of the storing and filtering means 7 comprise a second analog delay line of the surface acoustic wave type 72. This delay line 72 may have an input and a plurality of pairs of output electrodes delivering the N (optionally weighted) portions of the selected signal.

In the present description, it is assumed that the reference carrier is the quadrature receive carrier PR1, and that the direct receive carrier PR0 is deduced by delay of $3T_p/4$. The remainder of the description concerns various embodiments of the second phase-shifting means 19 making it possible to generate PR0 from PR1.

Clearly however, the invention is also applicable when the reference carrier is the direct receive carrier PR0 and the quadrature receive carrier PR1 is deduced from PR0 by delay of $T_p/4$.

With PR1 as reference carrier, the second phase-shifting means 19 may include a third analog delay line of the surface acoustic wave type having a delay of duration substantially equal to $T_p/4$, and sign inversion means. The sign inversion is equivalent to a delay of $T_p/2$, and the total delay $R_T$ is:

$$R_T = T_p/2 + T_p/4 = 3T_p/4$$

In a variant, when the storing and play-back means 18 are constituted by a second delay line 61 (cf FIG. 6), the second delay line is used to implement the second phase-shifting means. For example, this is done by adding a pair of output electrodes PR0, that are inverted and phase-shifted by $T_p/4$ relative to the output pair generating PR1.

In another variant shown in FIG. 8, when the storing and play-back means 18 are constituted by a second delay line 81 also acting as a filter (cf FIG. 7), the second delay line is used to implement the second phase-shifter means.

The second delay line 81 has a first plurality of pairs of electrodes delivering N (optionally weighted) portions $k_0$ to $k_{N-1}$ of the selected signal 16 whose sum (82) constitutes the filtered reference carrier PR1. The second delay line also has a second plurality of pairs of electrodes, which second plurality is inverted and phase-shifted by $T_p/4$ relative to the first plurality, and delivers N (optionally weighted) inverted portions $-k_0$ to $-k_{N-1}$ of the selected signal 16 whose sum (83) constitutes the filtered receive carrier PR0.

The above-described embodiment of the apparatus of the invention for generating receive carriers PR0, PR1 is implemented essentially with analog-type components. It should be noted, however, that digital-type components (digital signal processors, memories, read and write pointers, samplers, analog-to-digital converters, etc.) may also be used to implement the apparatus of the invention.

Figure 9:
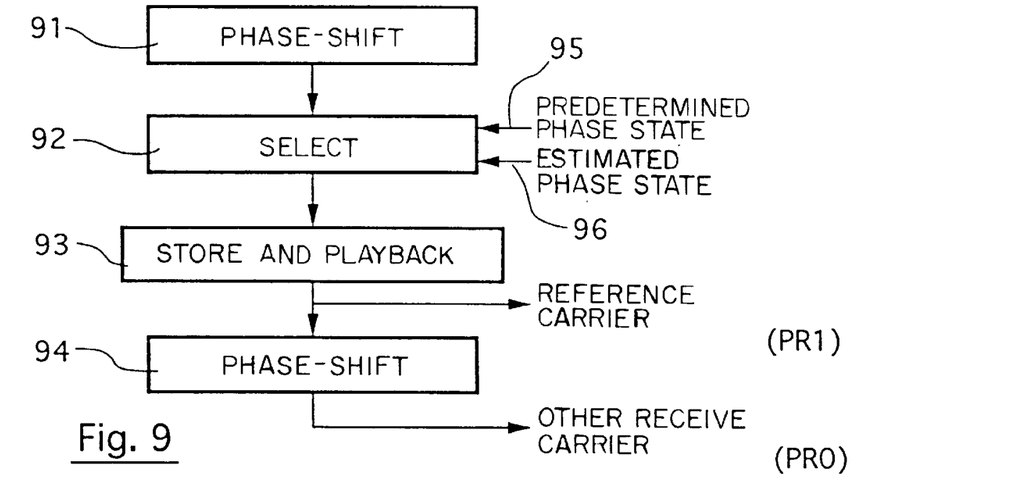
FIG. 9 is a flow chart of the method of the invention for generating receive carriers.

FIG. 9 shows a flow chart of the method of the invention for generating receive carriers PR0, PR1. The method comprises the following steps:

phase-shifting 91 said received signal 8 so as to generate a plurality of phase-shifted signals 14;

selecting 92 a signal, referred to as a selected signal 16, from among the plurality 14, as a function:
of a predetermined phase state 95 associated with the initialization symbol $S_i$ during reception of the initialization sequence; or
of an estimated phase state 96 estimated during reception of the message sequence;

so that the selected signal 16 constitutes the reference carrier PR1;

storing 93 the selected signal 16 constituting the reference carrier (e.g. PR1) and playing it back 93 after a delay that is substantially equal to a symbol duration Ts; and phase-shifting 94 the reference carrier so as to generate the other receive carrier (e.g. PR0).

We claim:

1. Apparatus for generating two receive carriers (PR0, PR1) having the same frequency, referred to as the carrier frequency fp=1/Tp, and being in quadrature relative to each other, said apparatus being designed to be integrated in a demodulation stage for demodulating a received signal (8) modulated using phase modulation having at least two phase states (P1 to P16), said received signal (8) conveying at least one series of symbols, which series is constituted by an initialization sequence comprising at least one initialization symbol (Si), and by a message sequence comprising at least one message symbol ($Su_1$ to $Su_3$), each symbol corresponding to one of said phase states;

said apparatus being characterized in that said initialization sequence is known to said apparatus (1), and in that said apparatus (1) comprises:

first phase-shifting means (13) for generating a plurality of phase-shifted signals (14) from said received signal (8), each phase-shifted signal having a distinct phase shift relative to said received signal;

signal selection means (15) for selecting a signal, referred to as a selected signal (16) from among said plurality (14), as a function
either of a predetermined phase state (17) associated with said initialization symbol (Si) during reception of said initialization sequence,
or of an estimated phase state (10) estimated by said demodulation stage on the basis of the received signal (8) during reception of said message sequence;

said selected signal (16) constituting one of said receive carriers and referred to as a reference carrier;

storing and play-back means (18) for storing the selected signal (16) and playing it back after a delay that is substantially equal to a symbol duration (Ts), so as to deliver said reference carrier; and second phase-shifting means (19) for generating the other one of said receive carriers from said reference carrier.

2. Apparatus according to claim 1, characterized in that said distinct phase shift presented by each phase-shifted signal (14) relative to the received signal (8) is equal to the phase shift between one of said possible phase states (P1 to P16) and said reference carrier.

3. Apparatus according to claim 1, characterized in that said first phase-shifting means (13) comprise a first analog delay line (52) of the surface acoustic wave type, having an input (51) and a plurality of pairs of output electrodes ((a0, a1), ..., (f1', f0')) delivering said plurality of phase-shifted signals (14), each pair of output electrodes delivering one of said phase-shifted signals presenting a phase shift that is a function of the distance between said input and said electrodes.

4. Apparatus according to claim 1, said phase modulation being combined with amplitude modulation, so as to constitute quadrature amplitude modulation (QAM) having a plurality of possible phase-amplitude states (P1 to P16);

said apparatus (1) being characterized in that it includes means for weighting each of the phase-shifted signals generated by the first phase-shifting means (13), so that said selected signal (16) has amplitude that remains substantially constant over time, regardless of the successively selected phase-shifted signals.

5. Apparatus according to claim 4, characterized in that said weighting is obtained by modifying the lengths of the pairs of output electrodes ((a0, a1), . . . , (f1', f0')).

6. Apparatus according to claim 1, characterized in that said storing and play-back means (18) comprise a second delay line of the surface acoustic wave type, having an input and a pair of output electrodes for playing back the selected signal (16) after said predetermined delay that is substantially equal to a symbol duration (Ts).

7. Apparatus according to claim 1, characterized in that said storing and play-back means (18) also comprised filtering means for filtering said selected signal (16), while enabling N successive portions ($k_0$ to $k_{N-1}$) of said selected signal to be stored, said filtering consisting of playing back a filtered signal obtained by summing (73) said N successive portions.

8. Apparatus according to claim 7, characterized in that each of the N portions of the selected signal has a duration (Ts/N) that is substantially equal to the period Tp of the receive carriers (PR0, PR1).

9. Apparatus according to claim 7, characterized in that each of the N portions ($k_0$ to $k_{N-1}$) of the selected signal (16) is assigned a weighting coefficient ($c_0$ to $C_{N-1}$).

10. Apparatus according to claim 7, characterized in that said storing and play-back means (18) comprise a second delay line of the surface acoustic wave type, having an input and a plurality of pairs of output electrodes delivering said N portions ($k_0$ to $k_{N-1}$) of the selected signal (16).

11. Apparatus according to claim 1, characterized in that said reference carrier is a direct receive carrier (PR0), and in that said second phase-shifting means (19) shifts the phase of said reference barrier by about $T_p/4$, so as to generate, by delay, the other of said receive carriers, referred to as a quadrature receive carrier (PR1).

12. Apparatus according to claim 1, characterized in that said reference carrier is a quadrature receive carrier (PR1), and in that said second phase-shifting means (19) shifts the phase of said reference carrier by about $3T_p/4$, so as to generate, by delay, the other one of said receive carriers, referred to as a direct receive carrier (PR0).

13. Apparatus according to claim 12, characterized in that said second phase-shifting means (19) comprise a third analog delay line of the surface acoustic wave type having a delay substantially equal to $T_p/4$, and sign-inverting means.

14. Apparatus according to claim 6, characterized in that said second delay line also constitutes said second phase-shifting means, by having an additional output electrode pair that is inverted and offset by $T_p/4$ relative to said pair of output electrodes.

15. Apparatus according to claim 10, characterized in that said second delay line also constitutes said second phase-shifting means, by having a plurality of additional output electrode pairs that are inverted and offset by $T_p/4$ relative to said plurality of pairs of output electrodes.

16. A demodulation stage for demodulating a received signal (8) modulated by using phase modulation having at least two phase states, said received signal conveying at least one series of symbols, which series is constituted by an initialization sequence comprising at least one initialization symbol (Si), and by a message sequence comprising at least one message symbol ($Su_1$ to $Su_3$);

said demodulation stage being characterized in that it includes apparatus (1) according to claim 1 for generating two receive carriers (PR0, PR1).

17. A method of generating two receive carriers (PR0, PR1) having the same frequency, referred to as the carrier frequency $f_p=1/T_p$, and being in quadrature relative to each other, said method being designed to be implemented in a demodulation stage for demodulating a received signal (8) modulated using phase modulation having at least two phase states, said received signal conveying at least one series of symbols, which series is constituted by an initialization sequence comprising at least one initialization symbol (Si), and by a message sequence comprising at least one message symbol ($Su_1$ to $Su_3$), each symbol corresponding to one of said phase states;

said method being characterized in that said initialization sequence is known to said demodulation stage, and in that said method comprises the following steps:

phase-shifting (91) said received signal so as to generate a plurality of phase-shifted signals, each phase-shifted signal having a distinct phase shift relative to said received signal;

selecting (92) a signal, referred to as a selected signal, from among said plurality, as a function:
of a predetermined phase state (95) associated with said initialization symbol during reception of said initialization sequence; or
of an estimated phase state (96) estimated by said demodulation stage on the basis of the received signal during reception of said message sequence;
so that said selected signal constitutes one of said receive carriers, referred to as a reference carrier;

storing (93) the selected signal and playing it back (93) after a delay that is substantially equal to a symbol duration, so as to deliver said reference carrier (PR1); and phase-shifting (94) said reference carrier (PR1) so as to generate the other one of said receive carriers (PR0).

\* \* \* \* \*